United States Patent [19]

Takahashi

[11] Patent Number: 5,739,865
[45] Date of Patent: Apr. 14, 1998

[54] IMAGE PROCESSING SYSTEM WITH SELECTIVE REPRODUCTION USING THINNING OUT OR INTERPOLATION

[75] Inventor: Koji Takahashi, Kanagawa-ken, Japan

[73] Assignee: Canon Kabushiki Kaisha, Tokyo, Japan

[21] Appl. No.: 493,654

[22] Filed: Jun. 22, 1995

[30] Foreign Application Priority Data

Jul. 1, 1994 [JP] Japan .................. 6-150869

[51] Int. Cl.⁶ .................. H04N 7/01; H04N 7/32
[52] U.S. Cl. .................. 348/441; 348/384; 348/391
[58] Field of Search .................. 348/441, 443, 348/445, 446, 448, 451, 426, 431, 699, 402, 384, 391, 427; H04N 7/01, 7/32

[56] References Cited

U.S. PATENT DOCUMENTS

| | | | |
|---|---|---|---|
| 4,745,459 | 5/1988 | Ninomiya et al. | 348/431 |
| 4,990,911 | 2/1991 | Fujita et al. | 341/123 |
| 4,998,167 | 3/1991 | Jaqua | 348/443 |
| 5,014,116 | 5/1991 | Kawai | 348/436 |
| 5,093,720 | 3/1992 | Krause et al. | 348/699 |
| 5,099,327 | 3/1992 | Murakoshi | 348/441 |
| 5,113,255 | 5/1992 | Nagata et al. | 348/699 |
| 5,138,448 | 8/1992 | Gillies et al. | 348/443 |
| 5,229,853 | 7/1993 | Myers | 348/443 |
| 5,303,045 | 4/1994 | Richards et al. | 348/443 |
| 5,335,013 | 8/1994 | Faber | 348/104 |
| 5,337,089 | 8/1994 | Fisch | 348/446 |
| 5,357,281 | 10/1994 | Ikeda et al. | 348/401 |
| 5,384,598 | 1/1995 | Rodriguez et al. | 348/384 |
| 5,428,399 | 6/1995 | Robinson et al. | 348/459 |
| 5,430,486 | 7/1995 | Fraser et al. | 348/426 |
| 5,453,792 | 9/1995 | Gifford et al. | 348/441 |
| 5,457,497 | 10/1995 | Thomas | 348/425 |
| 5,461,420 | 10/1995 | Yonemitsu et al. | 348/401 |
| 5,469,212 | 11/1995 | Lee | 348/392 |
| 5,485,279 | 1/1996 | Yonemitsu et al. | 348/411 |
| 5,504,532 | 4/1996 | Rhodes | 348/458 |
| 5,508,746 | 4/1996 | Lim | 348/429 |
| 5,537,157 | 7/1996 | Washino et al. | 348/722 |

Primary Examiner—Tommy P. Chin
Attorney, Agent, or Firm—Robin, Blecker, Daley and Driscoll

[57] ABSTRACT

An image processing system comprising an input circuit arranged to input an image signal of a first frame frequency, and a reproducing circuit arranged to reproduce the image signal inputted by the input circuit at a second frame frequency corresponding to a first television system or at a third frame frequency corresponding to a second television system, the second frame frequency and the third frame frequency each being lower than the first frame frequency.

14 Claims, 18 Drawing Sheets

AMOUNT OF DATA IN NTSC/PAL

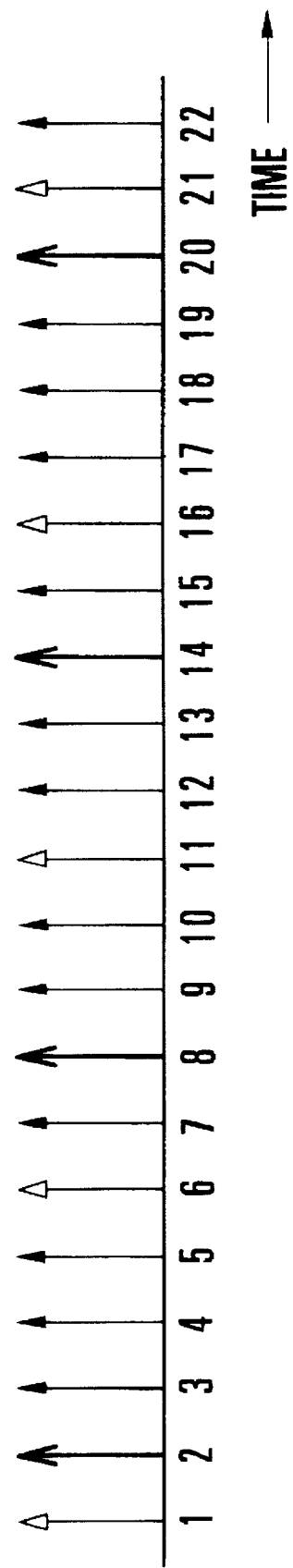
FIG.5
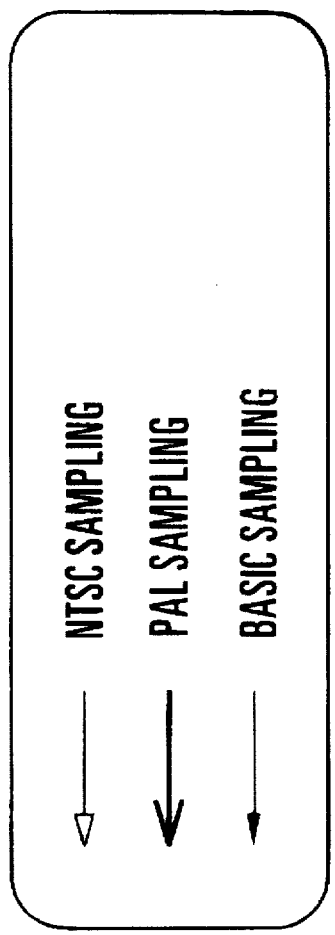
NTSC SAMPLING
PAL SAMPLING
BASIC SAMPLING

FIG.9

| VARIABLE LENGTH CODE DATA | PREDICTION ERROR |
|---|---|
| 0 | 000 |
| 10 | 001 |
| 110 | 002 - 003 |
| 1110 | 004 - 007 |
| 11110 | 008 - 015 |
| 111110 | 016 - 031 |
| 1111110 | 032 - 063 |
| 11111110 | 064 - 127 |
| 111111110 | 128 - 255 |

F I G. 10

| INDEX | | | | ID FILE | | TIME FILE | | TABLE-OF-CONTENTS FILE |
|---|---|---|---|---|---|---|---|---|
| LEVEL I | LEVEL II | LEVEL III | LEVEL IV | START No. | END No. | YEAR, MONTH AND DAY OF START TIME | HOUR, MINUTE AND SECOND OF START TIME | NAMES OF CONTENTS |
| 1 | 1 | 1 | 0 | 0 | 10 | 19910706 | 07:25:30 | MORNING |
| 1 | 1 | 2 | 0 | 11 | 20 | 19910706 | 07:30:18 | MORNING |
| 1 | 1 | 3 | 0 | 21 | 57 | 19910706 | 07:42:56 | MORNING |
| 1 | 1 | 4 | 0 | 58 | 66 | 19910706 | 07:55:18 | MORNING |
| 1 | 1 | 5 | 0 | 67 | 89 | 19910706 | 08:08:21 | MORNING |
| 1 | 2 | 1 | 0 | 90 | 112 | 19910706 | 19:02:43 | PARTY |
| 1 | 2 | 2 | 0 | 113 | 155 | 19910706 | 20:23:11 | PARTY |
| 2 | 1 | 1 | 0 | 156 | 188 | 19911217 | 11:55:23 | BIRTHDAY |
| 2 | 1 | 2 | 0 | 189 | 223 | 19911217 | 12:23:35 | BIRTHDAY |
| 2 | 1 | 3 | 0 | 224 | 256 | 19911217 | 13:07:15 | BIRTHDAY |

NTSC : NORMAL-REPRODUCTION

PAL: 1/2 SLOW-REPRODUCTION

IMAGE PROCESSING SYSTEM WITH SELECTIVE REPRODUCTION USING THINNING OUT OR INTERPOLATION

BACKGROUND OF THE INVENTION

1. Field of the Invention

This invention relates to an image processing system for recording and reproducing video information.

2. Description of the Related Art

In recording moving image information, it has been generally practiced to record the information in conformity with a standard television system employed in the area where the record is expected to be reproduced. Therefore, images have been picked up at a rate of 30 frames per sec within the zone of the NTSC system, including Japan, the United States, etc, and at a rate of 25 frames per sec within the zone of the PAL system, including European countries.

The conventional practice has necessitated selection of one of different television systems, such as the NTSC system and the PAL system, in recording according to the area where the record is to be reproduced. Therefore, it has been hardly possible to impart universality to the use of video information on images picked up.

SUMMARY OF THE INVENTION

It is an object of this invention to provide an image processing system which excels in performance.

It is another object of the invention to provide an image processing system which is capable of processing image signals of a plurality of frame frequencies.

It is a further object of this invention to provide an image processing system which is capable of processing image signals conforming to a plurality of television systems.

it is a further object of this invention to provide a high performance image processing device.

It is a further object of this invention to provide an image processing device which is capable of processing image signals of a plurality of frame frequencies.

It is a still a further object of this invention to provide an image processing device which is capable of processing image signals conforming to a plurality of television systems.

To attain these objects, one embodiment of this invention is composed of input means for inputting an image signal of a first frame frequency, and reproducing means for reproducing the image signal inputted by the input means at a second frame frequency corresponding to a first television system or a third frame frequency corresponding to a second television system, the second and third frame frequencies each being lower than the first frame frequency. The arrangement enables the image signal to be reproduced in accordance with any of a plurality of different television systems.

Another embodiment of this invention is composed of input means for inputting an image signal of a first frame frequency, and reproducing means for reproducing the image signal inputted by the input means at a second frame frequency or a third frequency which is lower than the first frame frequency, the first frame frequency being a common multiple of the second and third frame frequencies. That arrangement enables the image signal to be reproduced in any of a plurality of different frame frequencies.

The above and other objects and features of this invention will become apparent from the following detailed description of embodiments thereof taken in conjunction with the accompanying drawings.

BRIEF DESCRIPTION OF THE DRAWINGS

FIG. 5 shows the sampling timing of the embodiment of this invention.

FIG. 9 shows a table of variable length codes obtainable by the embodiment of this invention.

FIG. 10 shows the arrangement of data files of the embodiment of this invention.

DETAILED DESCRIPTION OF THE PREFERRED EMBODIMENT

Figure 1:
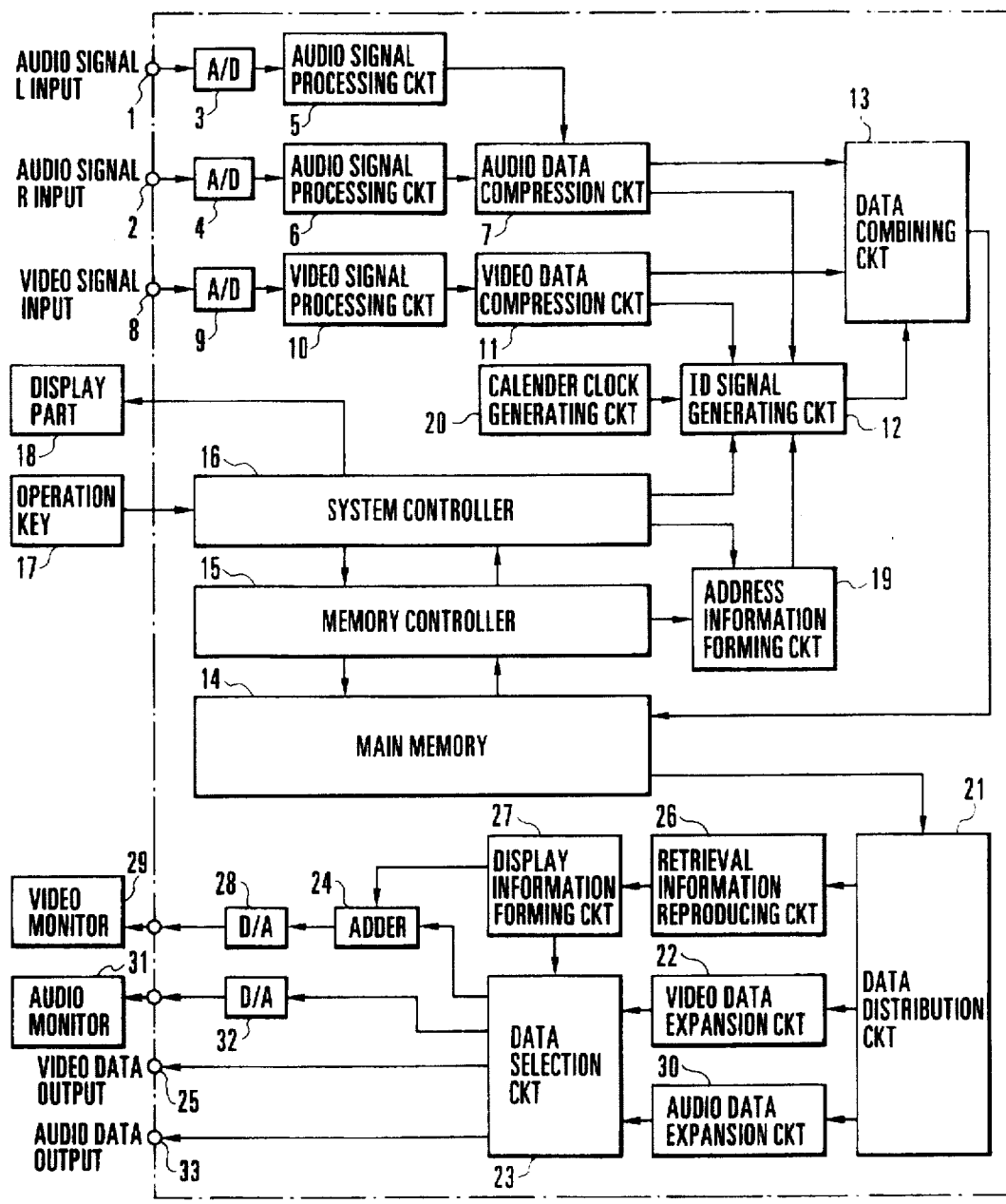
FIG. 1 is a block diagram showing the arrangement of a video system of an embodiment of this invention.

FIG. 1 is a block diagram showing the arrangement of a video system of an embodiment of this invention.

In recording, left and right (hereinafter referred to as L and R) stereophonic audio signals are respectively inputted from analog audio signal input parts 1 and 2 The audio signals L and R are converted into digital audio signals by A/D converters 3 and 4. The digital audio signals are supplied to audio signal processing circuits 5 and 6 to be subjected to various processes including a noise removing process, a dynamic range limiting process, etc. The outputs of the audio signal processing circuits 5 and 6 are supplied to an audio data compression circuit 7 to be subjected to a data compressing process for audio signals. This compressing process can be carried out, for example, in accordance with the method of adaptive transform coding (ATAC, ATRAC, ASPEC, etc.) or sub-band coding (MUSICAM.

SB/ADPCM, etc.) proposed by the Moving Picture Experts Group (MPEG) or may be carried out by a vector coding method using an L/R correlation with the two channels mixed.

Next, a video signal which is inputted from a video signal input part 8 is converted into a digital video signal by an A/D converter 9 which is arranged to be capable of processing at a higher speed than the A/D converters 3 and 4. The digital video signal is supplied to a video signal processing circuit 10 to be subjected to a preprocessing action. The preprocessed digital video signal is supplied to a video data compression circuit 11 to have its data amount compressed down to one scores-th to one several-hundredth of the amount. In the case of a moving image, for example, the compression process is accomplished by carrying out an inter-frame correlation process using a temporal image correlation and a motion compensation process for lessening deterioration of picture quality due to the compression. In addition to these processes, the compression process is also accomplished by using a forward predictive-coded frame (P picture) obtained by making prediction in the forward direction on a time base and a bidirectionally predictive-coded frame (B picture) obtained by making prediction both in the forward and backward directions (past and future) with these processes used in a suitable combination. A standard picture quality which is about equal to that of a ½ inch VTR can be attained in accordance with an MPEG-1 algorithm proposed by the MPEG, and a good picture quality which excels the quality of the NTSC system can be attained in accordance with another algorithm MPEG-2 of the MPEG.

Data obtained from an ID signal generating circuit 12 which will be described later is supplied to a data combining circuit 13 to be combined with the audio data and the video data. Composite data thus obtained is stored in a main memory 14. A memory controller 15 is arranged to control the memory addresses of the main memory 14 and writing and reading actions on the main memory 14. A system controller 16 controls the operation of the whole system including the change-over of the actions of the memory controller 15. The system controller 16 is arranged to receive instructions given from an operation key 17 for recording, reproduction, retrieval and selection of operation modes, such as a moving image recording mode, a still image recording mode, etc. Upon receipt of such an instruction, the system controller 16 controls the memory controller 15 and, at the same time, causes a display part 18 to display information about the remaining amount of memory, a state of operation, time codes which indicate a recording or reproducing time, etc. The system controller 16 also informs an address information forming circuit 19 of time codes, etc. The time codes can be divided mainly into two kinds. The first kind of the time codes includes a length of the time passing from the beginning of a recording medium or a video program, an accumulating time of images picked up by the camera, etc. The second kind includes the year, month and day or the hour, minute and second of recording or shooting by the camera, the time of each frame, etc. The embodiment is provided with a calendar clock generating circuit 20 for the purpose of generating the time codes of the latter kind.

The address information forming circuit 19 is arranged to receive data about an information storing state, etc. from the memory controller 15 and transfers the data to the ID signal generating circuit 12 as information on the amount of data of each information. At the ID signal generating circuit 12, time codes and mode selection signals for picture quality and sounds are formed on the basis of information received from the system controller 16. Further, the amount of data (or data length, in the case of variable length coding) of video images and sounds and a leading address value on the memory storing the data are formed on the basis of information received from the memory controller 15. The data thus formed is supplied to the data combining circuit 13 to be arranged in one data block for every ID signal. The leading addresses of the main memory 14 in which the data blocks are stored are then written into an ID file provided in the main memory 14 one after another.

Figure 2:
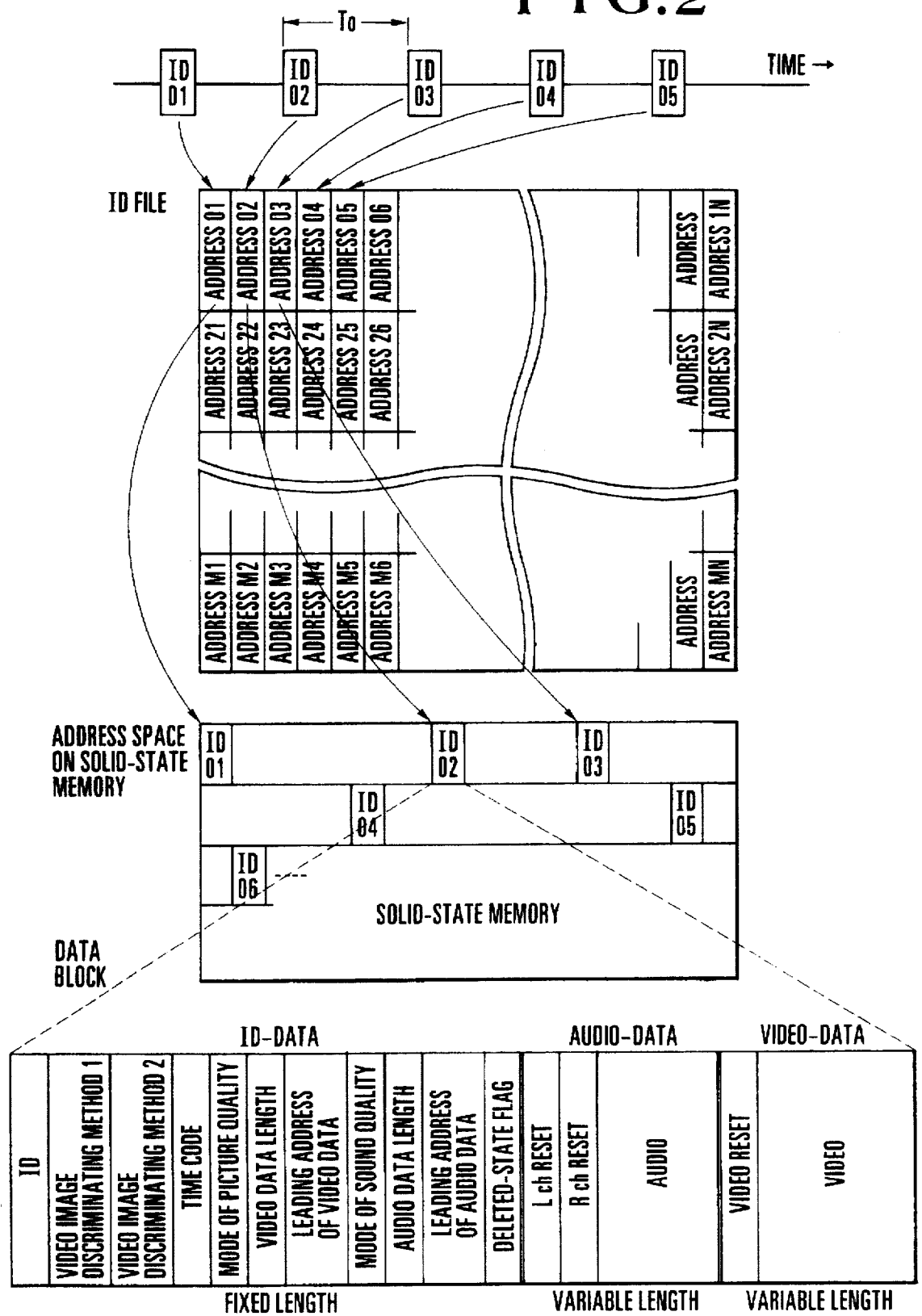
FIG. 2 shows the data storing state of a main memory of the embodiment of this invention.

FIG. 2 shows by way of example how data is stored within the main memory 14 which is composed of a solid-state memory. As shown at the upper part of FIG. 2, an abscissa is used to show a time base. In this case, the ID data is formed at intervals of a predetermined period of time To. Numbers are assigned to the respective ID data as 01, 02, 03, . . . , beginning with a leading part. The ID data is then stored in an address space of the solid-state memory as shown in FIG. 2. After the ID data, video and audio information data, the amounts of which data vary for every processing period due to the variable length coding, are stored one after another. Therefore, although the ID data is generated at intervals of a fixed time length (To), in the address space on the memory, however, the ID data is not equally spaced, as shown in FIG. 2. Therefore, to permit high speed access to a desired data block at the time of retrieval, an ID file which shows the storage locations of all the addresses in one place is formed beforehand. In the ID file, only the leading addresses of data blocks are arranged in a proper order according to the storage capacity of the main memory and stored within an area set beforehand.

In the data block, the ID data has a fixed length and has basic information of ten kinds, in the case of the example shown in FIG. 2. The basic information includes a time code, picture and sound quality selected by trading off the recording time, the leading addresses of audio and video data, the lengths of which are variable, and the amounts of the audio and video data. The video system is discriminated by selecting an expanding or compressing method according to input video information. A deleted-state flag is provided in erasing recorded data, for inhibiting normal reproduction, by bringing it into a restorable, logically erased state before a deleting process is physically carried out.

In this instance, the audio data consists of initialization information (reset data) for each of the L and R channels and audio data of a variable length obtained by a compressing process. The video data consists of initialization information (video reset data) obtained by the intraframe coding or the like and compressed data which has been variable-length coded in accordance with one of compressing methods of varied kinds. For every ID data, a data block is formed including the video data and the audio data in a pair. The data blocks in the embodiment are characterized in that they are formed at intervals defined on a time base.

Figure 3:
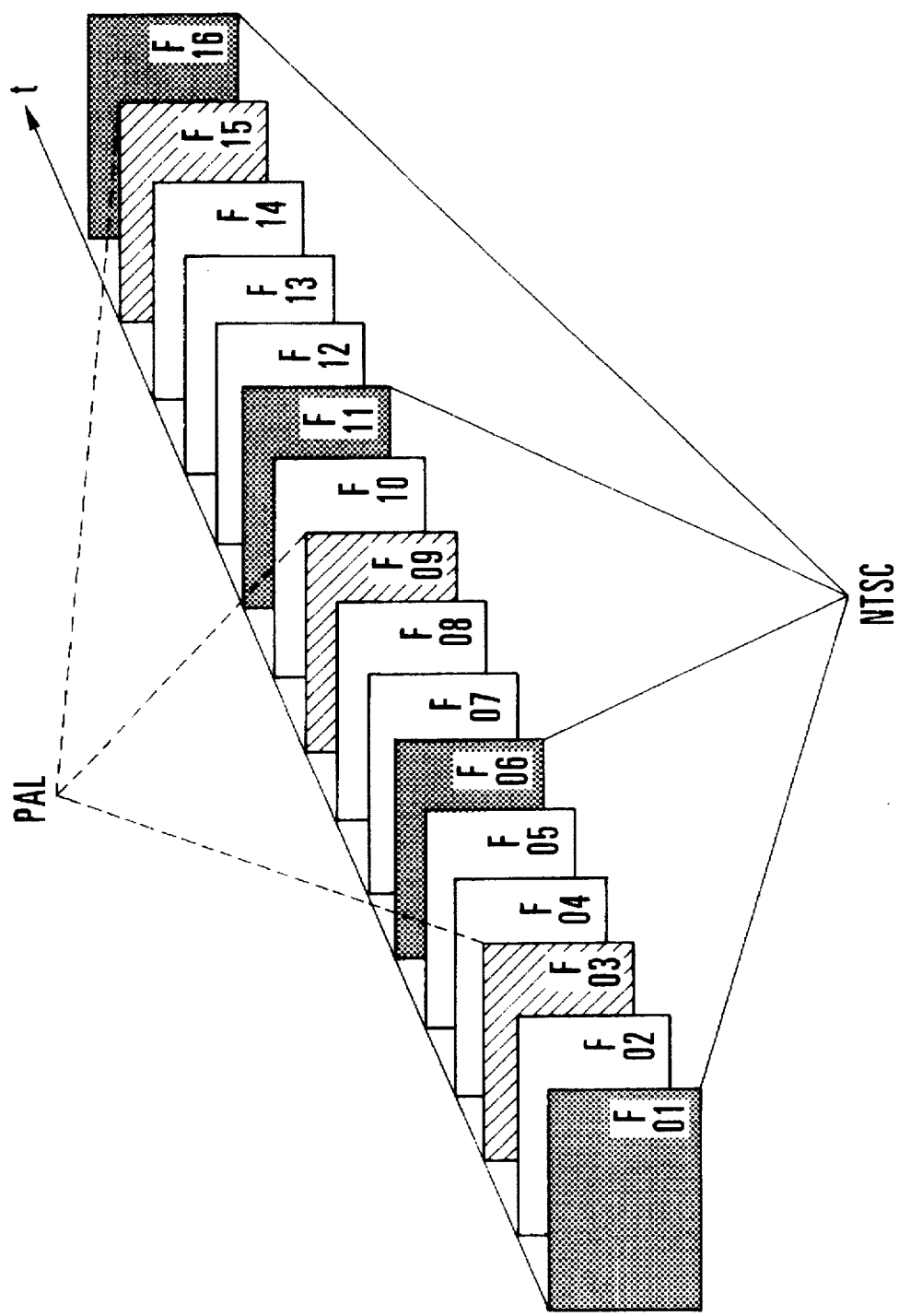
FIG. 3 shows the video signal arrangement of the embodiment of this invention.

FIG. 3 shows a manner in which the video signal inputted from the video signal input part 8 is arranged. The video signal is arranged to satisfy both the NTSC system which is a television system employed in the United States, Japan, etc, having 30 frames per sec (60 fields by 2:1 interlacing) and the PAL system which is a television system employed in Europe having 25 frames per second (50 fields by 2:1 interlacing). The arrangement of the video signal in the direction of the time base is composed of pictures F01 to F16 as shown in FIG. 3.

In the case of the NTSC system, the pictures F01, F06, F11 and F16 are used, while the pictures F03, F09 and F15 are used in the case of the PAL system. Incidentally, the component pictures of the NTSC system and those of the PAL system do not have to be used beginning with the picture F01 or F03. The operation is of course allowed to begin at any position because their correlation adequately varies as long as the intervals required for each of the systems is maintained.

Figure 4:
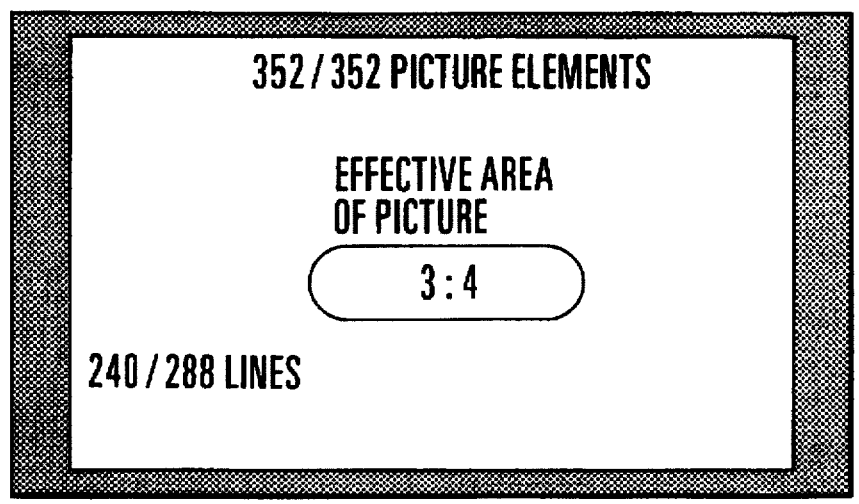
FIG. 4 shows the picture arrangement of the embodiment of this invention.

In a case where a picture is to be formed by the 2:1 interlacing for a higher time resolving power, picture elements are arranged as shown in FIG. 4. In this case, a larger value (288 vertical picture elements ×352 horizontal picture elements) of numbers of effective picture elements of the NTSC and PAL systems with respect to an SIF (Source input Format) specified as a standard input picture by the MPEG (Moving Picture Experts Group) is selected. This SIF picture is specified on the assumption of a noninterlaced frame structure. In recording, all the picture elements are processed. In reproducing the record, the frame structure is converted into an interlaced structure as necessary before outputting. For example, in the case of the NTSC system, the picture F01 in FIG. 3 is reproduced as an odd-number field and the picture F06 as an even-number field.

In a case where reproduction interchangeability with the PAL system is not necessary, the amount of data can be cut down by converting the picture arrangement into an interlacing structure in recording. Further, in the event of reproduction in accordance with the PAL system, the picture F03 in FIG. 3 is reproduced as an odd-number field and the picture F09 as an even-number field Since it is performed in a cycle recurring at every even-number picture, an interlace conversion process is necessary at the time of reproduction. In a case where reproduction is to be made in accordance with both the NTSC and PAL systems, either redundant scanning line information in the vertical direction within one picture is discarded or the number of scanning lines is converted by means of an interpolation filter and the output thus obtained is displayed.

Figure 6:
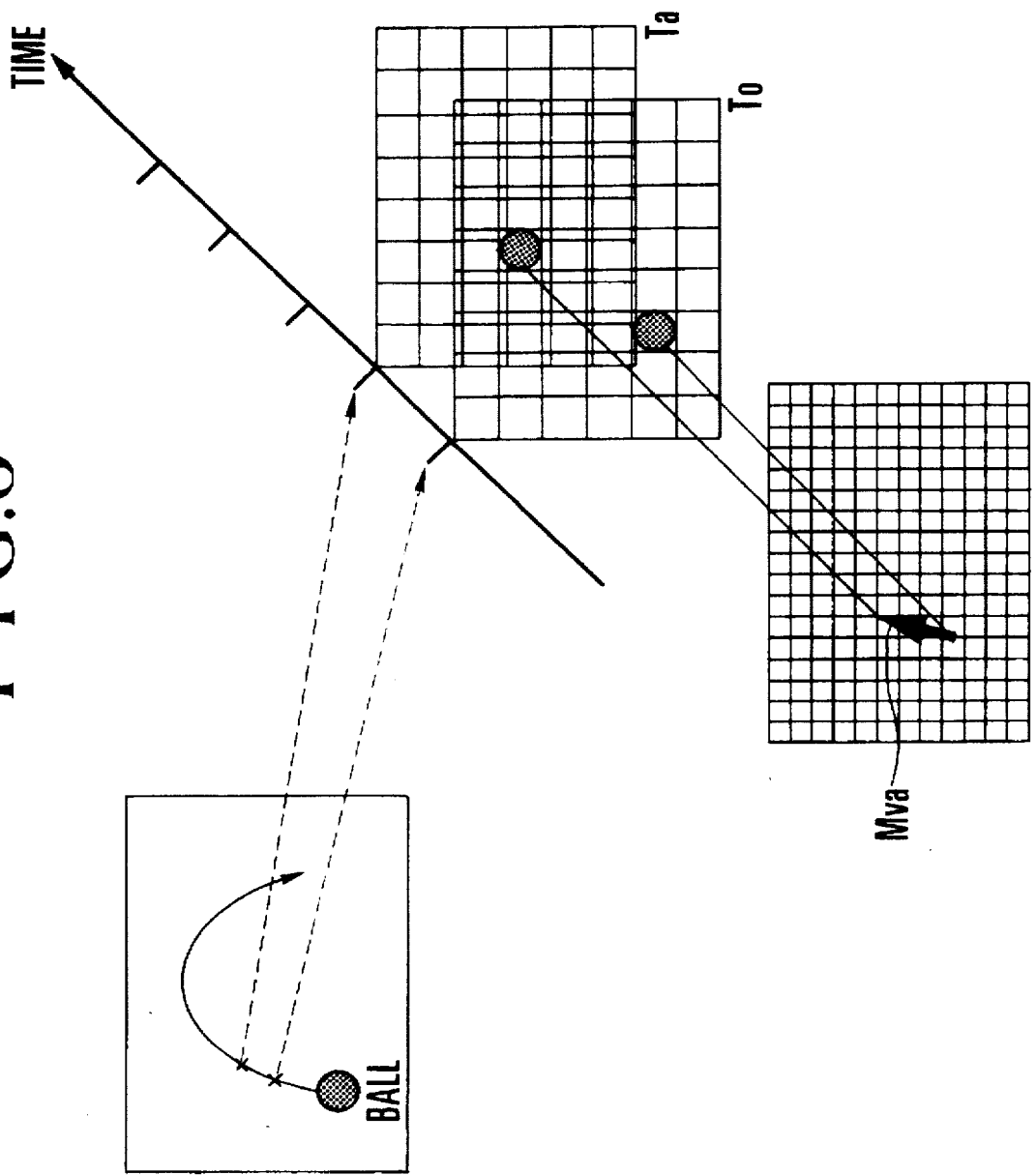
FIG. 6 shows the motion detecting concept of the embodiment of this invention.
Figure 7:
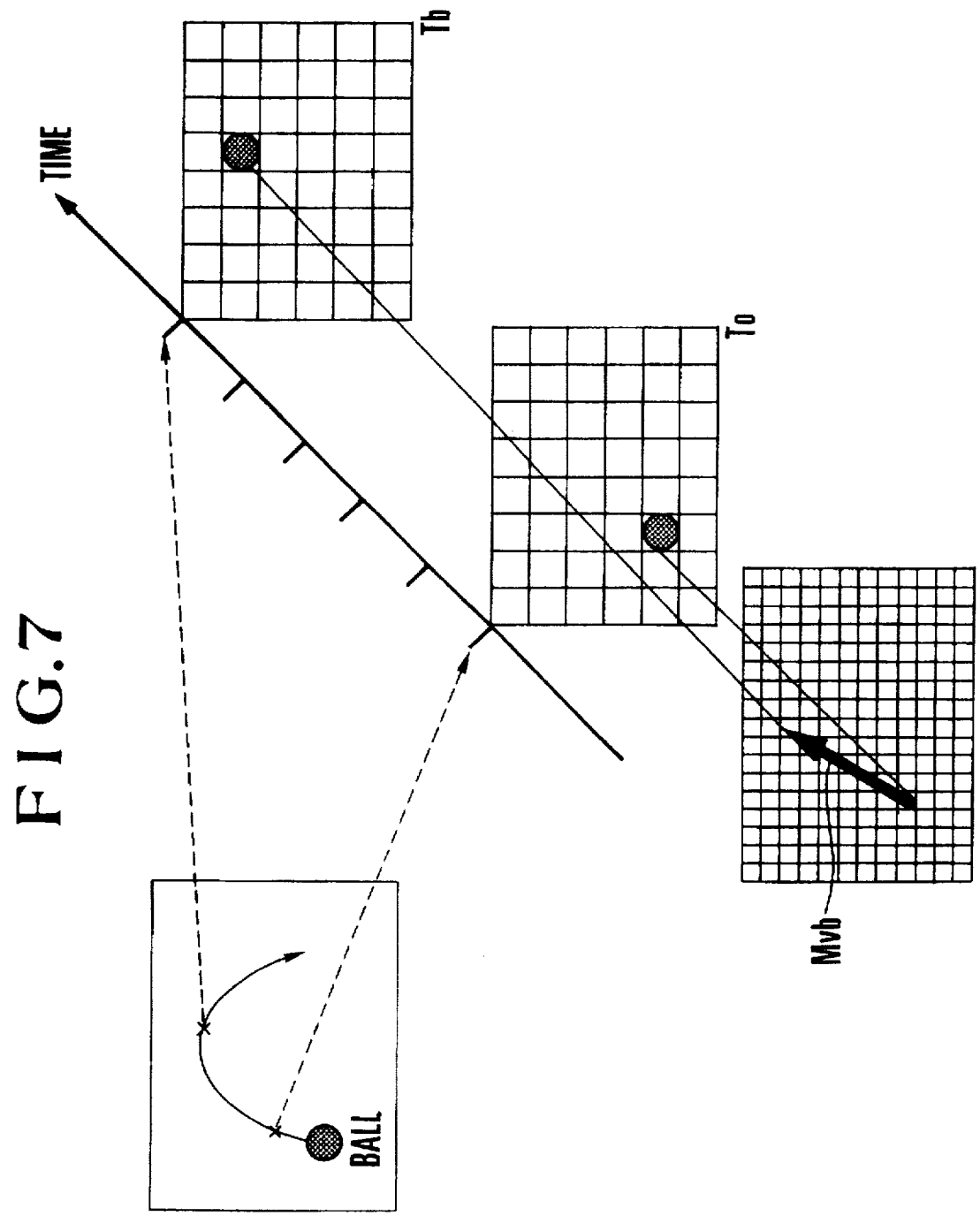
FIG. 7 also shows the motion detecting concept of the embodiment of this invention.

FIG. 5 shows the timing of sampling to be made in the direction of a time base. The basic sampling period is 300 pictures per sec. A sampling action is performed on the 300 pictures in a cycle of five pictures in accordance with the NTSC system and in a cycle of six pictures in accordance with the PAL system. Motion vectors obtained on the pictures sampled in such a cycle are conceptually shown in FIGS. 6 and 7. FIG. 6 shows a case where a motion vector MVa is detected between adjacent pictures To and Ta among the 300 pictures per sec in accordance with this invention. The illustration clearly shows that a parabolic motion of a ball is in close proximity to a rectilinear motion within a short period of time. FIG. 7 shows an example of sampling in accordance with the NTSC system. In this case, a motion vector MVb is detected between pictures To and Tb with five pictures left between them.

Figure 8:
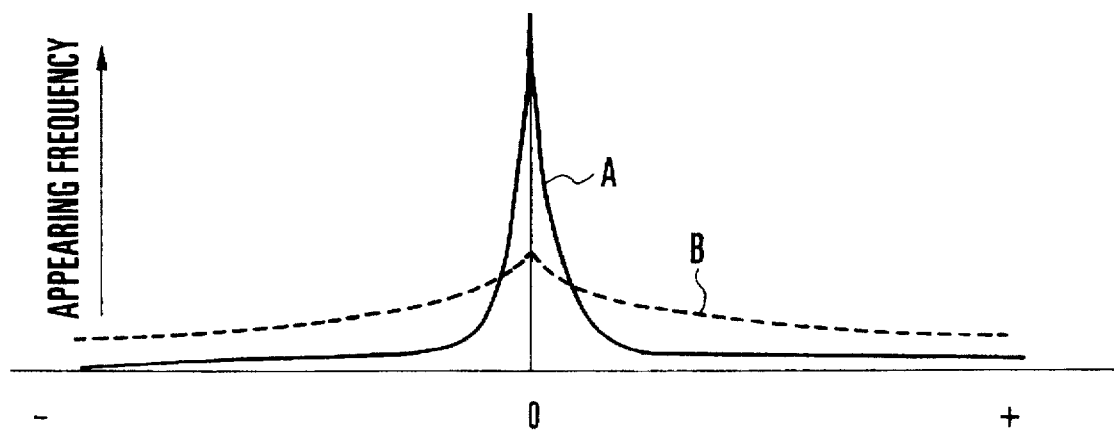
FIG. 8 shows a distribution of the appearing frequency of the differences between pictures obtained by the embodiment.

FIG. 8 schematically shows, on the basis of the things mentioned above, the amount of image information corresponding to the number of frames per unit time. In FIG. 8, a curve A represents a case where 300 frames are sampled per sec and a curve B another case where 60 frames are sampled per sec. The time interval between frames in the case A of 300 frames per sec is shorter than in the case B of 60 frames per sec, and a change of the amount of motion in the case. A is smaller than and ⅕ of the case B. Therefore, a tendency to concentrate on a zero axis of a frequency at which differences among picture elements appear is much higher in the case A than in the case B. This tendency can be utilized for reduction in the amount of data. If, for example, variable length codes (VLC) are associated with the appearing frequency as shown in FIG. 9, an amount of generation of prediction error data can be suppressed since the accuracy of motion vector prediction is improved because the motion vector itself becomes short due to the smallness of the amount of motion. Further, as to the form of the video signal, the video signal may be in conformity with the HDTV system or some other forms such as the one defined by some of the QCIF, CIF, or the like which are international standards for a video telephone system specified by H.261. With the data processed in the manner as described above, video data and audio data are stored in the main memory 14 shown in FIG. 1. It is possible to replace the memory with a memory of some other interchangeable memory form that permits use of an IC card or the like.

FIG. 10 shows a data file arrangement adopted for improvement in data retrieving power. The arrangement is described as follows: Index information can be set at various levels from a level I through a level IV. Large, medium and small indexes are allotted respectively to the levels I to III. Since the level IV is not used, zero is allotted to the level IV. Index words are formed in the minimum level unit. A start ID (identification) number and an end ID number are registered in the items of an ID file. The year, month and day and the hour, minute and second of a start time are registered in the items of a time file. Names of contents of indexes are registered as necessary in the items of a table-of-contents file. The items of the table-of-contents file of course may be left blank.

The time file is provided for storing, as time data, a time at which an instruction for forming index information is given in an applicable ID file which corresponds to the video and audio data being inputted. The provision of the time data enables a retrieving action to be promptly carried out on the basis of time. As described in the foregoing, the ID file is formed at intervals of a predetermined period of time. Therefore, with the start time and the end time of shooting found, any arbitrary point of intermediate time can be correlated with the video and audio data. Further, the names of the contents of the table-of-contents file correspond to chapters and paragraphs of a book and also to the movements and measures in the case of a music.

Figure 11:
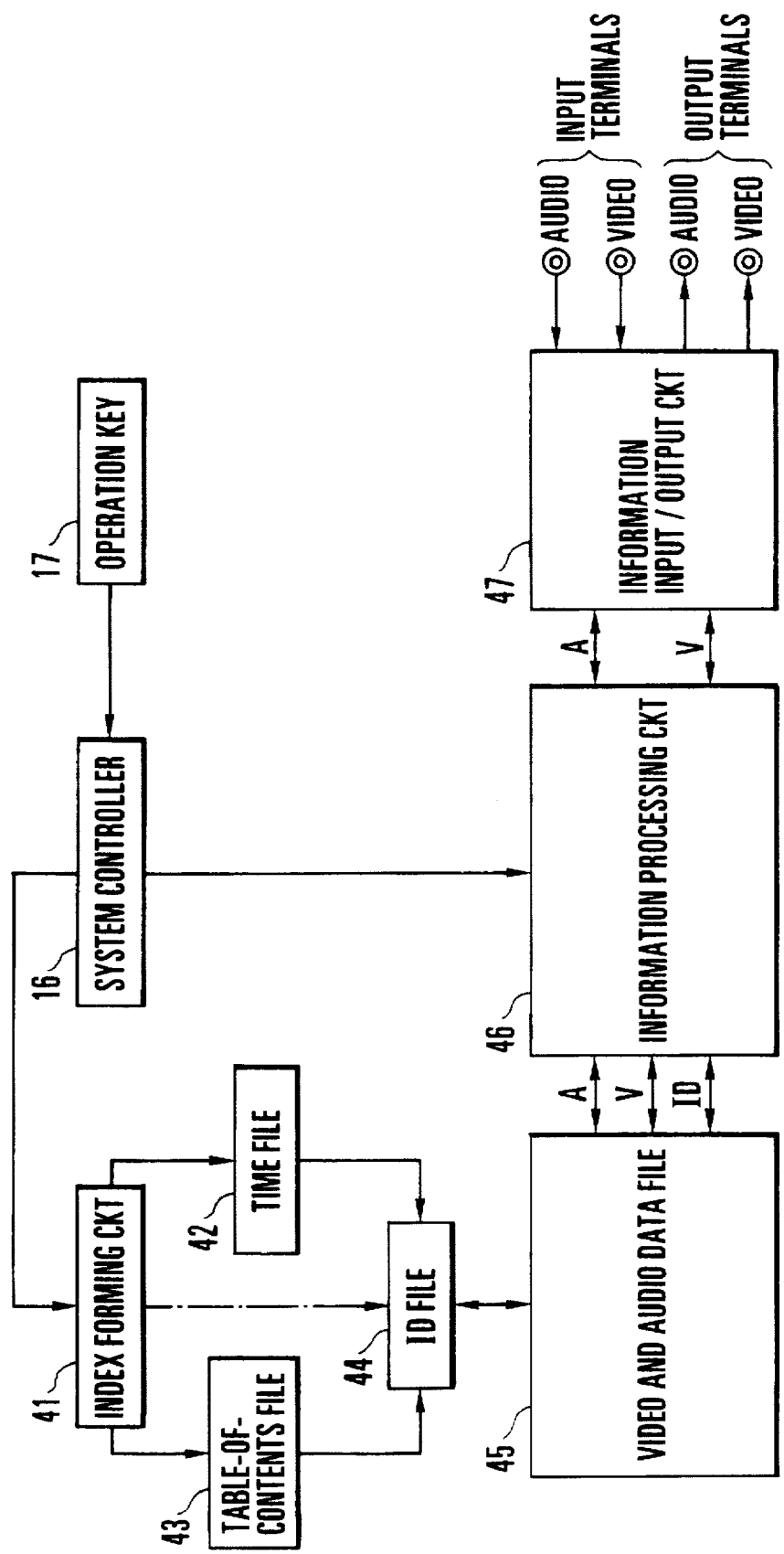
FIG. 11 is a block diagram showing in outline the video system of the embodiment of this invention.

FIG. 11 schematically shows the circuit arrangement shown in FIG. 1. Referring to FIG. 11, an index forming circuit 41 is disposed within the ID signal generating circuit 12 shown in FIG. 1. The index forming circuit 41 is arranged to form a time file 42 and a table-of-contents file 43 and to store these files in an ID file 44. The ID file 44 is further stored in a video and audio data file 45 which is formed within the main memory 14. Further, an information processing circuit 46 represents in one circuit the audio signal and video signal processing circuits in FIG. 1. An information input/output circuit 47 represents the A/D and D/A converters in FIG. 1 in a single circuit.

Figure 12:
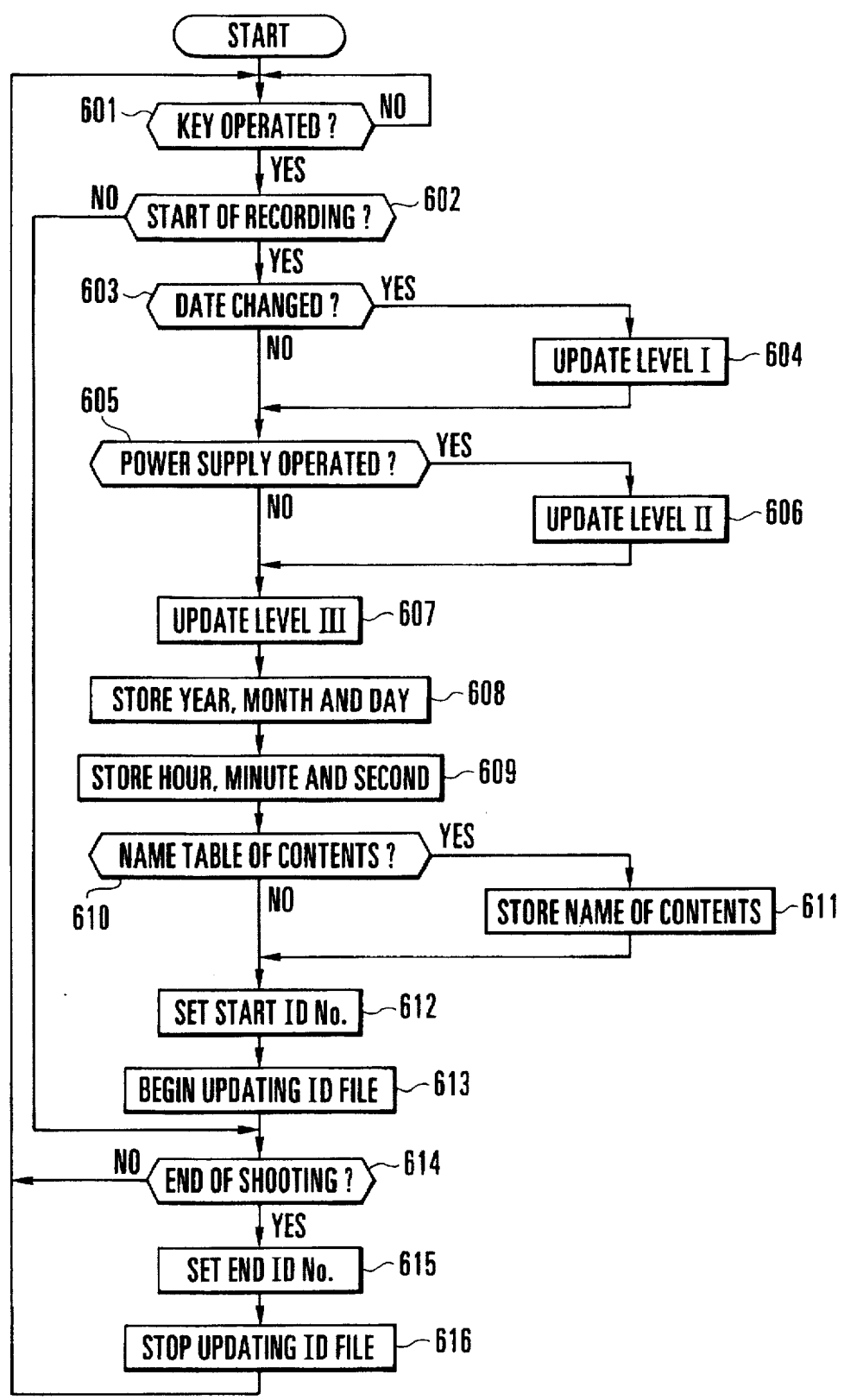
FIG. 12 is a flow chart showing a file forming operation performed in recording by the embodiment.

A file forming operation to be performed in recording is next described with reference to a flow chart shown in FIG. 12. With video and audio signals inputted through the input parts 1, 2 and 8, when an instruction is given by means of the operation key 17 at a step 601, the flow of operation comes to a step 602. At the step 602, a check is made to find if the instruction is for the start of recording. If so, the flow comes to a step 603. At the step 603, a check is made to find if a date has been changed. If so, the flow comes to a step 604 to update the level I which is a large index and then proceeds to a step 605. If not, the flow comes directly to the step 605.

At the step 605, a check is made to find if the power supply has been operated. If so, the flow comes to a step 606 to update the level II which is a medium index and then the flow proceeds to a step 607. If not, the flow comes directly to the step 607. At the step 607, the level III which is a small index is updated and the flow comes to a step 608. At the step 608, the data of year, month and day is stored in the time file. At a step 609, the data of hour, minute and second are stored in the time file. The flow then comes to a step 610 to make a check to decide if a name is to be given to the table of contents. If it is decided to give a name, the flow comes to a step 611 to store the name of the table of contents in the table-of-contents file and then the flow comes to a step 612. If not, the flow proceeds directly to the step 612.

At the step 612, a start ID number is set. At a step 613, the ID file begins to be updated. At a step 614, a check is made to find if shooting has come to an end. If so, the flow comes to a step 615 to set an end ID number. At a step 616, the process of updating the ID file comes to a stop to bring a series of processes to an end. These processes are executed at the ID signal generating circuit 12 shown in FIG. 1.

Figure 13:
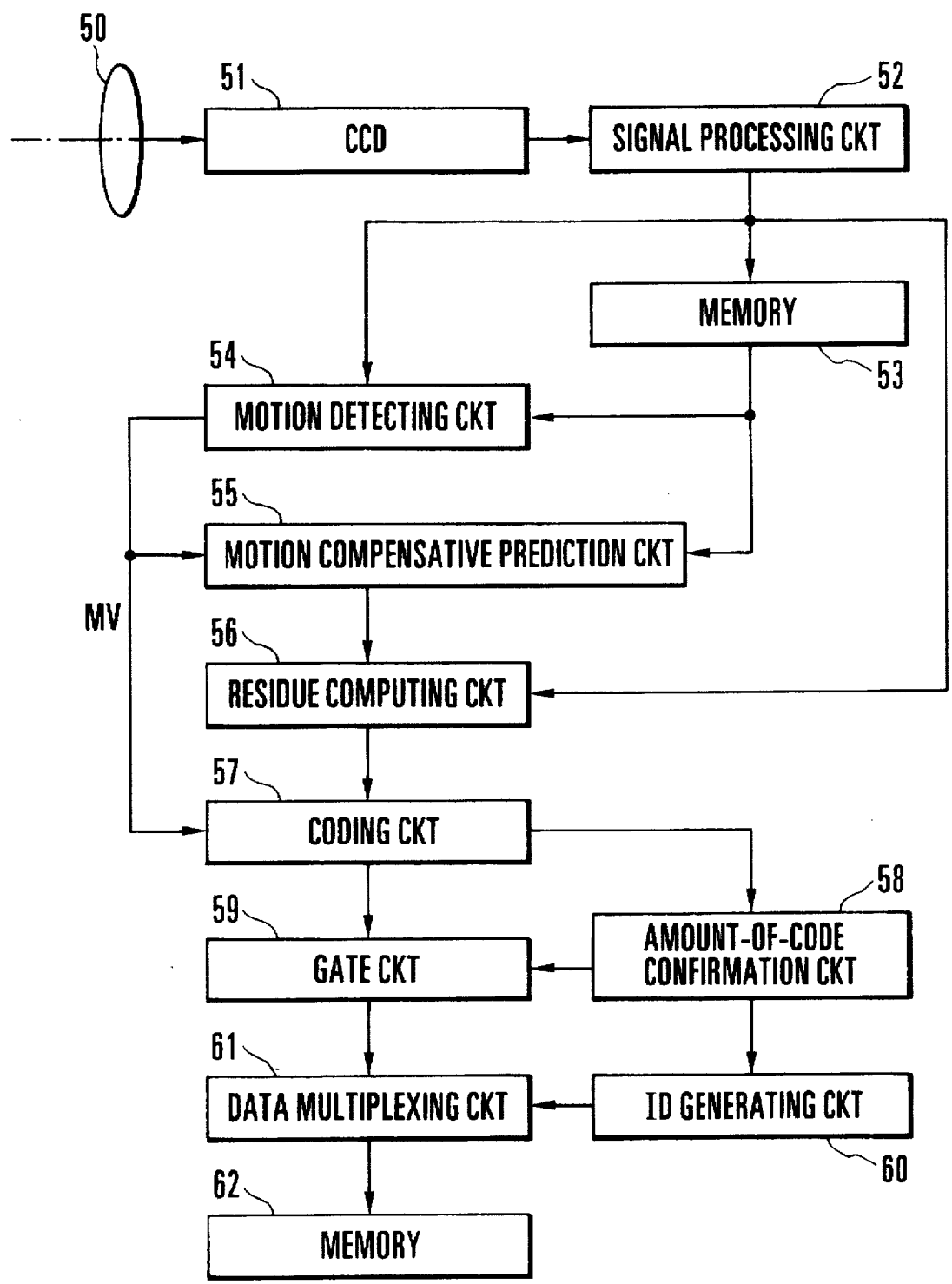
FIG. 13 is a block diagram showing in detail the circuits of an image pickup system.
Figure 14:
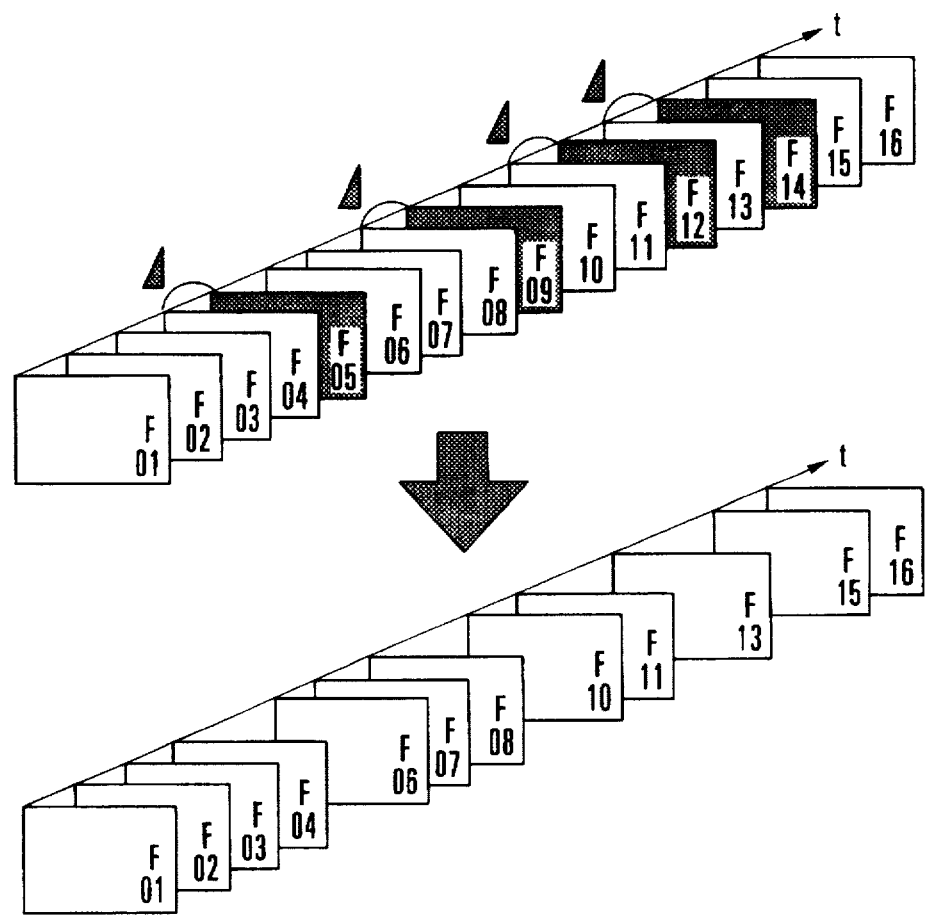
FIG. 14 shows the concept of a thinning out pictures in coding by the embodiment of this invention.

FIG. 13 shows in a block diagram the details of the circuits of an image pickup system in the video system shown in FIG. 1. An incident light image of an object of shooting which comes from an image pickup optical system 50 is formed on the image pickup plane of a CCD 51. A video signal which is obtained by photo-electrically converting the image at the CCD 51 is supplied to a signal processing circuit 52 to be processed into a form which conforms to a television signal. The video signal thus processed is supplied to a memory 53 and a motion detecting circuit 54. Information on a motion of the image is detected at the motion detecting circuit 54 by comparing the current picture with a previous picture stored in the memory 53. A motion compensative prediction is made by a motion compensative prediction circuit 55 on the basis of the information on the motion. Then, a residue computing circuit 56 computes the residue (error) between the predicted picture and the actual picture. The result of the computation and the information MV on the motion of the image are coded by a coding circuit 57. Meanwhile, the picture which is stored by the memory 53 to serve as a basic picture is also coded by the coding circuit 57. The amount of codes is confirmed at an amount-of-code confirmation circuit 58. The amount of codes is controlled by a gate circuit 59. If the amount of change in a picture (delta) is decided, as shown in FIG. 14, to be less than a predetermined value (the pictures F05, F09, F12 and F14), the image information is not coded, while the identification information formed by the ID generating circuit 60 is processed by a data multiplexing circuit 61. The results of the coding processes are stored in the memory 62.

A reproducing operation is next described. Referring to FIG. 1, when the operation key 17 is operated to give an instruction for reproduction, the system controller 16 causes the display part 18 to display that the system is in process of reproduction. Memory addresses and a reading action on the main memory 14 are controlled by the memory controller 15. Information signals stored in the main memory 14, including video information, stereophonic (two-channel) audio information and ID information which is provided for retrieving the video and audio information are read out from the main memory 14.

Information consisting of data of the above-stated three kinds including the ID data, audio data and video data in a mixed state (serial data information) is supplied to a data distribution circuit 21. The data distribution circuit 21 distributes the data in the following manner: The video data is supplied to a video data expansion circuit 22 to be subjected to a data expanding process in a manner reverse to the data compressing process performed at the time of recording. A video signal equivalent to the signal inputted at the time of recording is reproduced. The reproduced signal is supplied to a data selection circuit 23. The data selection circuit 23 outputs a video signal to an adder 24 for an analog video monitor and outputs digital video data to a digital video output terminal 25.

The ID data is supplied to a retrieval information reproducing circuit 26. At the retrieval information reproducing circuit 26, information shown in FIG. 2 is detected for each ID data. A display information forming circuit 27 then forms display information for the monitor. The display information is combined with the restored video data at the adder 24. The output of the adder 24 is supplied to a D/A converter 28 to be converted into an analog signal which is usable for general purposes. The analog signal is displayed by a video monitor 29.

The audio data is supplied to an audio data expansion circuit 30 to be subjected to a data expanding process, in the same manner as the video data. An audio signal which is equivalent to the input signal obtained at the time of recording is thus reproduced. The reproduced audio data is supplied to the data selection circuit 23. Upon receipt of the audio data, the data selection circuit 23 supplies it to a D/A converter 32 to have it converted into an analog signal for a sound monitor and also supplies it to a digital audio output terminal 33. Each of the video and audio data is reproduced while any deviations due to a delay time necessary in processing the reproduced signal are corrected by using the ID signal. After that, the reproduced video and audio signals are outputted from the data selection circuit 23 in synchronism with information from the display information forming circuit 27.

Figure 15:
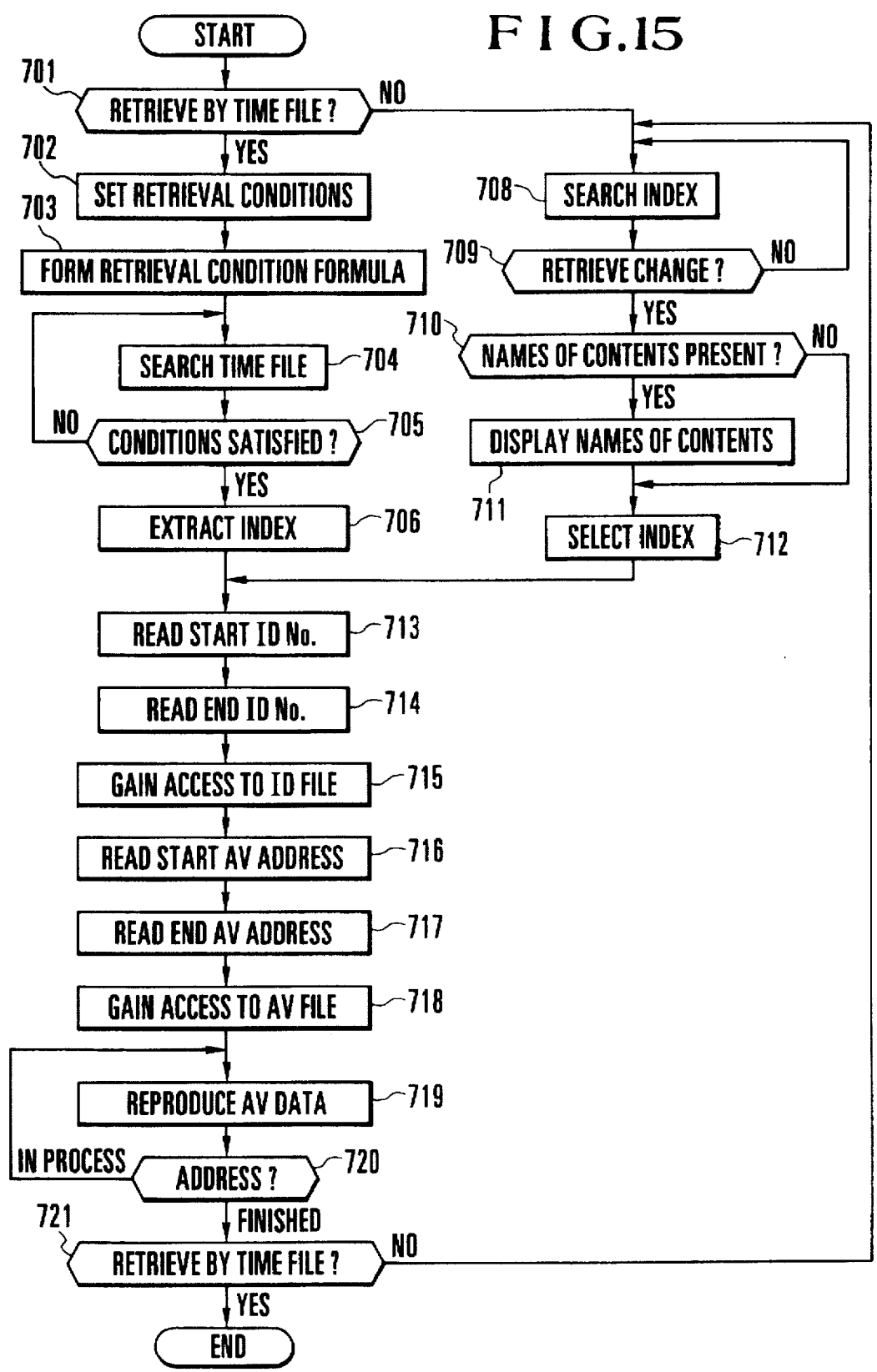
FIG. 15 is a flow chart showing a file retrieving operation to be performed at the time of reproduction by the embodiment of this invention.

A file retrieving operation to be performed at the time of reproduction is described, with reference to a flow chart shown in FIG. 15, as follows: At a step 701, a check is made to find if a retrieval is to be made by using the time file. If so, the flow of operation proceeds to a step 702. At the step 702, retrieval conditions such as the year, month and day or the hour, minute and second of a start time are set. At a step 703, a retrieval condition formula is formed. At a step 704, the time file is searched. At a step 705, a check is made to find if the conditions are satisfied. If so, the flow proceeds to a step 706 to extract an applicable index. If not, the step 704 is repeated.

Further, if it is decided at the step 701 not to perform a retrieval by using the time file, the flow comes to a step 708. At the step 708, an index search is made. In a case where a change in the index is to be retrieved at a step 709, the flow comes to a step 710. At the step 710, a check is made to find if the names of contents are present. If no retrieval is required at the step 709, the flow comes back to the step 708. If it is found at the step 710 that the names of contents are present, the flow comes to a step 711 to display the names of contents before coming to a step 712. If no name of contents is found, the flow proceeds directly to the step 712. At the step 712, an index is selected and then the flow proceeds to a step 713.

At the step 713, a start ID number is read. At a step 714, an end ID number is read. At a step 715, the ID file is accessed. At a step 716, the start addresses of video and audio (hereinafter referred to as AV) files are read. At a step 717, the end addresses of the AV files are read. At a step 718, the AV files are accessed. At a step 719, the AV data are reproduced. At a step 720, a check is made to find if the addresses of the AV files have come to an end. If not, the flow of operation comes back to the step 719 to repeat the step 719. If so, the flow proceeds to a step 721 to retrieve the time file After that, a series of processes comes to an end.

Figure 16:
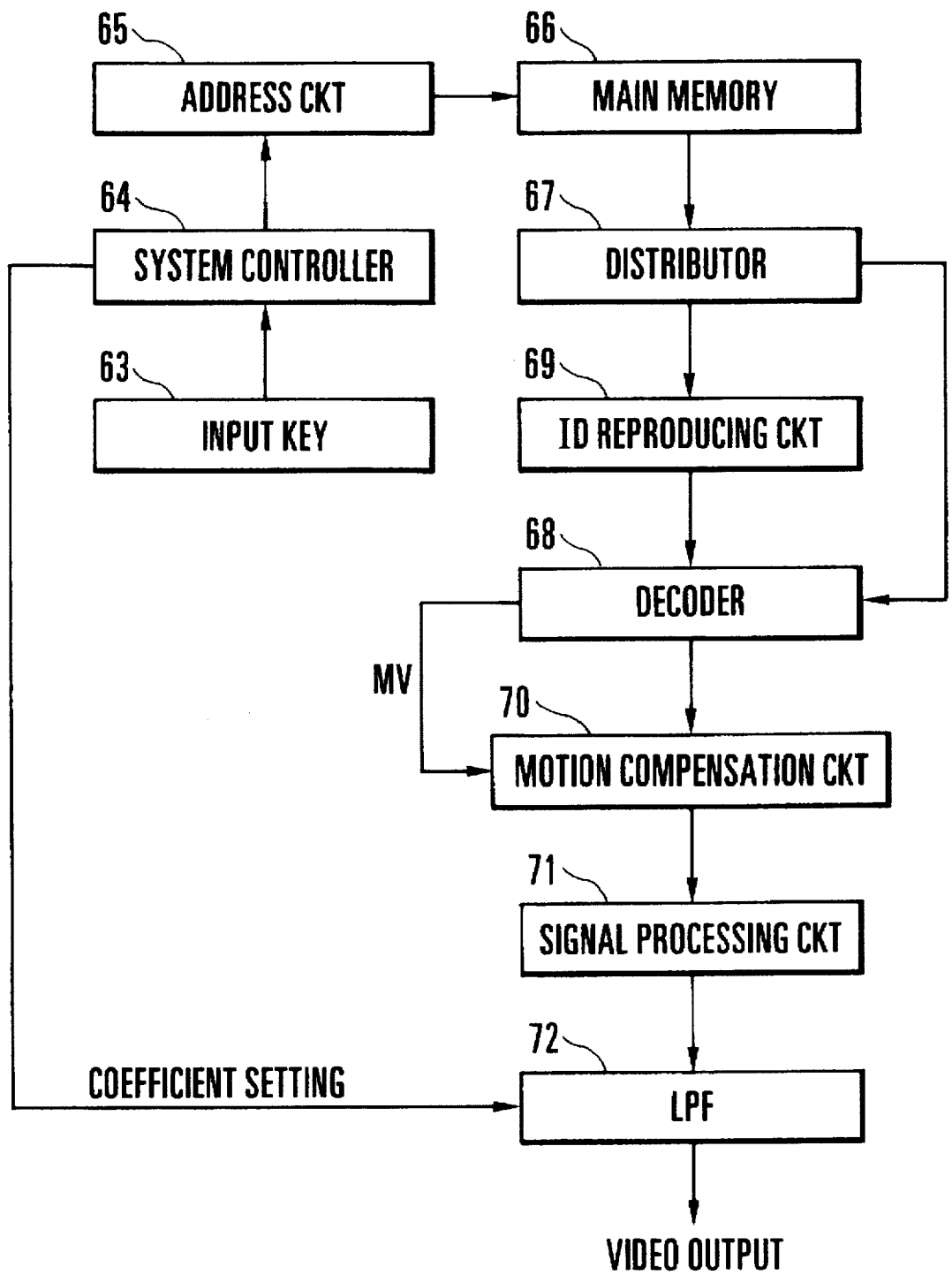
FIG. 16 is a block diagram showing the circuits of a reproduction system of the embodiment of this invention.

FIG. 16 shows the details of the circuit arrangement of the reproduction system in the video system shown in FIG. 1. The reproduction system is described with reference to FIG. 16 as follows: When an instruction for a desired reproduction mode and a reproduced picture or pictures is given from an input key 63 to a system controller 64, an address circuit 65 sets a memory address corresponding to the instruction. Information stored in a main memory 66 is read out according to the reading address. The information read out is divided by a distributor 67 into image data and ID data. Main information such as the image data, etc., is decoded by a decoder 68. The ID data is recomposed by an ID reproducing circuit 69. A motion compensation circuit 70 then carries out a motion compensating image interpolation on the decoded main information in accordance with the recomposed ID data. The output of the motion compensation circuit 70 is supplied to a signal processing circuit 71 to be converted into a signal which is in conformity with a standard television signal.

A time resolving power (defined as the resolving power in pictures per sec) of 300 pictures per sec is secured by the image pickup system as mentioned in the foregoing. At the time of reproduction according to the NTSC system or the PAL system, therefore, a process is performed to reduce the number of pictures down to ⅕ or to ⅙ of the 300 pictures. Then, each picture has an exposure time of 1/300 sec at the most. Hence, an aliasing error due to sampling takes place in the direction of the time base. In order to prevent giving any disagreeable impression to the visual sensation, therefore, a low-pass filter (LPF) 72 is provided in the rear of the signal processing circuit 71. The LPF 72 is normally formed by arranging a picture delaying circuit such as a field memory or the like to have a cyclic coefficient. Any unnecessary drop in the time resolving power can be prevented by optimizing the cycling coefficient of the LPF 72 according to the reproduction mode.

Figure 17:
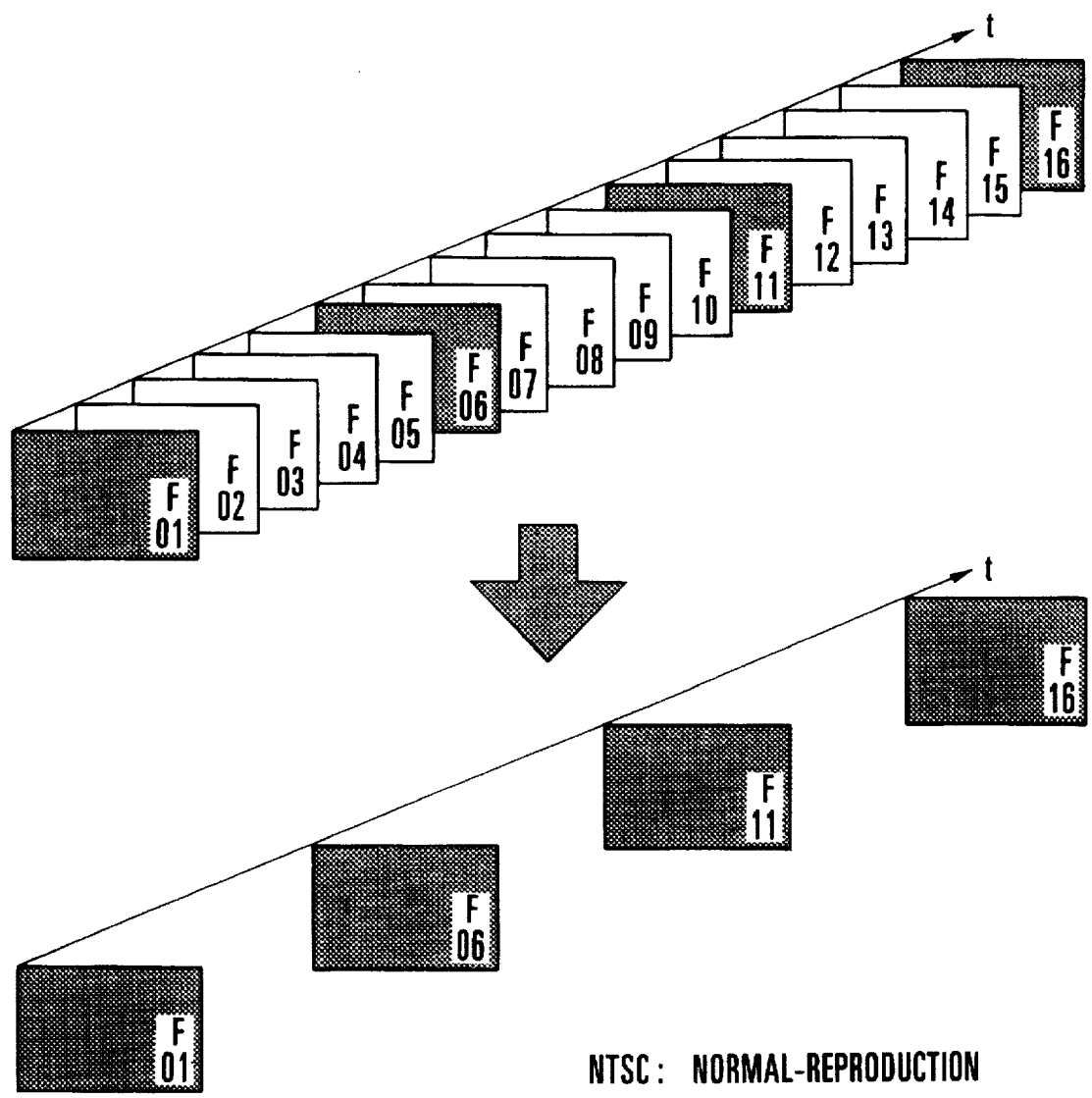
FIG. 17 shows a picture arrangement made by the embodiment of this invention at the time of reproduction in a normal mode in conformity with the NTSC system.
Figure 18:
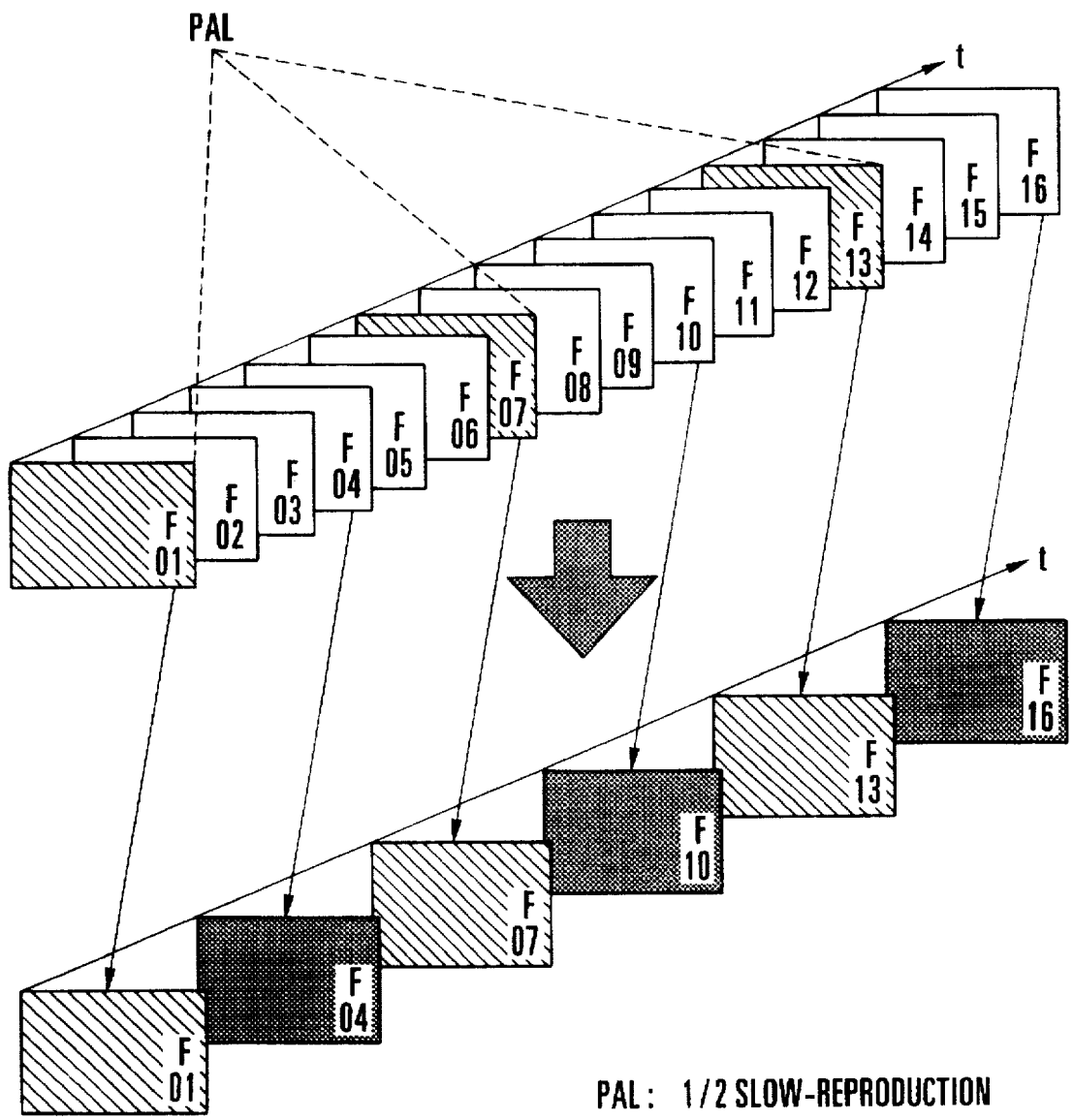
FIG. 18 shows a picture arrangement made by the embodiment of this invention at the time of reproduction at a ½ speed in conformity with the PAL system.

FIG. 17 shows pictures obtained by carrying out reproduction at a standard speed according to the NTSC system. The picture storing state of the memory is shown in the upper part of FIG. 17. A result of a process of reducing the number of pictures down to ⅕ for conformity with the NTSC system is shown in the lower part of FIG. 17. FIG. 18 shows pictures obtained by carrying out reproduction at a ½ speed according to the PAL system. The picture storing state of the memory is shown in the upper part of FIG. 18. A result of a process of reducing the number of pictures down to ⅓ to obtain twice as many as the number of pictures obtainable in conformity with the PAL system is shown in the lower part of FIG. 18. Since the number of pictures per reading time is exactly in conformity with the PAL system, an outputting process is performed using a length of time which is twice as long as the normal length of time. As a result, a slow-motion reproducing operation at a ½ speed can be realized In FIG. 18, pictures F01, F07 and F13 which are shown with hatching represent normal PAL standard pictures. Pictures F04, F010 and F16, which are shown with halftone dots and are obtained at ½ points of the time intervals of these normal PAL standard pictures, serve to enhance the time resolving power. In a case where three pictures are to be reproduced from data for four frames, for example, it is necessary to have a higher resolving power than the time resolving power of images picked up at the rate of 300 frames per sec. In that case, a higher time resolving power can be attained by forming some interpolation image between adjacent frames.

As described in the foregoing, the resolving power in the direction of the time base thus can be enhanced by the embodiment. Therefore, in cases where images of quickly moving objects, such as objects in sport scenes, are to be picked up, high-quality video images can be obtained in an easily viewable state, because pictures are interconnected in a natural manner. Further, the improvement in the resolving power in the direction of the time base decreases the amount of information between pictures in carrying out the process of compressing the video signal, so that the amount of generating data can be cut down. Further, since the video information picked up can be used without limitation, the universality of use of the information increases. For example, one and the same system can be used for reproduction in conformity either with the NTSC system or with the PAL system as desired. The arrangement of the embodiment of this invention, therefore, obviates the necessity of selecting a television system in recording according to the area where the record is expected to be played back.

What is claimed is:

1. An image processing system comprising:
   a) input means for inputting an image signal of a first frame frequency; and
   b) reproducing means for reproducing the image signal inputted by said input means at a second frame frequency or a third frame frequency which is lower than the first frame frequency, the first frame frequency being a common multiple of the second frame frequency and the third frame frequency;
   wherein said reproducing means performs reproduction by carrying out an inter-picture thinning-out process on the image signal of the first frame frequency, if a time resolving power of the image signal to be obtained by said reproducing means is not higher than a time resolving power of the image signal of the first frame frequency, or by carrying out a picture interpolating process on the basis of the image signal of the first frame frequency, if the time resolving power of the image signal to be obtained by said reproducing means is higher than the time resolving power of the image signal of the first frame frequency.

2. A system according to claim 1, wherein the second frame frequency corresponds to NTSC system and the third frame frequency corresponds to PAL system.

3. A system according to claim 1, further comprising storage means for storing the image signal inputted by said input means.

4. A system according to claim 1, further comprising coding means for compression-coding the image signal inputted by said input means.

5. An image processing system, comprising:
   a) input means for inputting an image signal of a frame frequency which is higher than a frame frequency to be used for reproduction;
   b) coding means for compression-coding the image signal inputted by said input means, wherein said coding means performs a motion-compensative predictive coding on the image signal in such a manner than an amount of prediction error occurring when the coding is performed at the frame frequency of the image signal inputted by said input means becomes smaller than when the coding is performed at the frame frequency to be used for reproduction;
   c) reproducing means for reproducing the image signal compression-coded by said coding means;

wherein, said reproducing means performs reproduction by carrying out an inter-picture thinning-out process on the compression-coded image signal, if a time resolving power of an image signal to be obtained by said reproducing means is not higher than a time resolving power of the image signal input by said input means, or by carrying out a picture interpolating process on the basis of the compressor-coded image signal, if the time resolving power of the image signal to be obtained by said reproducing means is higher than the time resolving power of the image signal input by said input means.

6. A system according to claim 5 wherein said input means inputs an image signal of a first frame frequency, and said reproducing means reproduces the image signal inputted by said input means at a second frame frequency corresponding to a first television system or at third frame frequency corresponding to a second television system, the second frame frequency and the third frame frequency each being lower than the first frame frequency.

7. A system according to claim 6, wherein the second frame frequency corresponds to NTSC system and the third frame frequency corresponds to PAL system.

8. A system according to claim 5, further comprising storage means for storing the image signal inputted by said input means.

9. A system according to claim 5, wherein said input means is an image pickup means for picking up an image.

10. An image processing system comprising:

a) input means for inputting an image signal at a first frame frequency which is higher than a frame frequency to be used for reproduction; and b) coding means for compression-coding the image signal inputted by said input means, wherein said coding means performs a motion-compensative predictive coding on the image signal in such a manner than an amount of motion of the images occurring when the coding is performed at the first frame frequency becomes smaller than when the coding is performed at the frame frequency to be used for reproduction;

c) reproducing means for reproducing the image signal compression-coded by said coding means;

wherein said reproducing means performs reproduction by carrying out an inter-picture thinning-out process on the image signal of the first frame frequency, if a time resolving power of an image signal to be obtained by said reproducing means is not higher than a time resolving power of the image signal of the first frame frequency, or by carrying out a picture interpolating process on the basis of the image signal of the first frame frequency, if the time resolving power of the image signal to be obtained by said reproducing means is higher than the time resolving power of the image signal of the first frame frequency.

11. A system according to claim 10, wherein said input means is an image pickup means for picking up an image.

12. A system according to claim 10, wherein said reproducing means reproduces the image signal inputted by said input means at a second frame frequency corresponding to a first television system or a third frame frequency corresponding to a second television system, the second frame frequency and the third frame frequency each being lower than the first frame frequency.

13. A system according to claim 12, wherein the second frame frequency corresponds to NTSC system and the third frame frequency corresponds to PAL system.

14. A system according to claim 12, further comprising storage means for storing the image signal inputted by said input means.

* * * * *